(12) United States Patent
Glaser (10) Patent No.: US 9,808,866 B2
(45) Date of Patent: Nov. 7, 2017

(54) SELF-ADJUSTING CHAMFERING TOOL

(71) Applicant: NOGA ENGINEERING & TECHNOLOGY (2008) LTD., Shlomi (IL)

(72) Inventor: Rami Glaser, Moshav Shavel Zion (IL)

(73) Assignee: Noga Engineering & Technology (2008) Ltd., Shlomi (IL)

( * ) Notice: Subject to any disclaimer, the term of this patent is extended or adjusted under 35 U.S.C. 154(b) by 108 days.

(21) Appl. No.: 14/806,669

(22) Filed: Jul. 23, 2015

(65) Prior Publication Data

US 2017/0021428 A1 Jan. 26, 2017

(51) Int. Cl.
*B23B 5/16* (2006.01)
*B23B 51/10* (2006.01)

(52) U.S. Cl.
CPC ............ *B23B 5/168* (2013.01); *B23B 51/103* (2013.01); *B23B 2215/72* (2013.01); *B23B 2220/04* (2013.01); *B23B 2251/58* (2013.01); *B23B 2270/16* (2013.01); *B23B 2270/34* (2013.01)

(58) Field of Classification Search
CPC ..... B23B 5/167; B23B 5/168; B23B 2215/72; B23B 2220/04; B23B 2270/34
See application file for complete search history.

(56) References Cited

U.S. PATENT DOCUMENTS 8,678,721 B2 * 3/2014 Shozda ................. B23B 29/034
408/152

FOREIGN PATENT DOCUMENTS

| CN | 203663924 | 6/2014 | |
|---|---|---|---|
| DE | 102011008265 | 7/2012 | |
| FI | WO 2012101319 A1 * | 8/2012 | ............ B23B 5/168 |
| RU | 2301724 | 6/2006 | |
| WO | WO2006119548 | 11/2006 | |

OTHER PUBLICATIONS

International Search Report for PCT Application No. PCT/IL2016/050806 dated Nov. 7, 2016.

* cited by examiner

*Primary Examiner* — Alan Snyder
(74) *Attorney, Agent, or Firm* — Pearl Cohen Zedek Latzer Baratz LLP (57) ABSTRACT

A self-adjusting tool for chamfering an end of a cylinder includes a plurality of legs. A distal segment of each of the legs extends in a forward direction of the tool and is placeable about the end of the cylinder. A central body has a rotatable shaft and a mechanism that is operable by rotation of the shaft about a shaft axis. The mechanism is operable to retract the legs inward in tandem toward the cylinder and to rotate the legs about the shaft axis when further retraction of the legs is blocked by contact with the cylinder. One or a plurality of chamfering blades are each attached to one of the legs. A cutting edge of each blade is oriented diagonally forward and inward.

12 Claims, 7 Drawing Sheets

SELF-ADJUSTING CHAMFERING TOOL

FIELD OF THE INVENTION

The present invention relates to a self-adjusting chamfering tool.

BACKGROUND OF THE INVENTION

A section of pipe is often cut from a longer pipe. The cut section of pipe may then be included in an assembly of pipes and pipe sections. Assembly typically involves insertion of one end of the pipe section into an opening whose inner diameter is only slightly larger than the outer diameter of the pipe section. For example, the opening may be in a fitting for connecting ends of two or more pipes. Where a fluid is to flow through the fitting joint between the pipe section and the opening, a sealing ring or gasket is typically inserted into the fitting joint.

An end of a pipe section that is to be assembled into an opening is often chamfered or beveled (terms that are used interchangeably herein). The chamfering may facilitate insertion of the pipe inserted into the opening. Chamfering may also reduce or eliminate the risk damage to a sealing gasket by sharp edges at the cut. In some cases, chamfering may reduce the risk of injury to a person who is handling the pipe section by sharp edges at the cut.

Typical tools for chamfering an end of a pipe include specially shaped knives that may be applied manually or that may be applied to a pipe section that is mounted on a rotating chuck or lathe, and tools that are designed for a specific pipe diameter.

SUMMARY OF THE INVENTION

There is thus provided, in accordance with an embodiment of the present invention, a self-adjusting tool for chamfering an end of a cylinder, the tool including: a plurality of legs, a distal segment of each of the legs extending in a forward direction of the tool and placeable about the end of the cylinder; a central body with a rotatable shaft and a mechanism that is operable by rotation of the shaft about a shaft axis, the mechanism operable to retract the plurality of legs inward in tandem toward the cylinder and to rotate the plurality of legs about the shaft axis when further retraction of the plurality of legs is blocked by contact with the cylinder; and one or a plurality of chamfering blades, each chamfering blade being attached to a leg of the plurality of legs, a cutting edge of each blade being oriented diagonally forward and inward.

Furthermore, in accordance with an embodiment of the present invention, each leg of the plurality of legs includes a bend between a proximal segment that is laterally extendible from the central body and the distal segment.

Furthermore, in accordance with an embodiment of the present invention, each chamfering blade is attached to the bend of a leg of the plurality of legs.

Furthermore, in accordance with an embodiment of the present invention, the mechanism is configured to retract the plurality of legs inward by rotating each leg of the plurality of legs about a leg axis.

Furthermore, in accordance with an embodiment of the present invention, each leg axis includes a gear, the mechanism including a central gear on the shaft that engages the gear of each leg axis.

Furthermore, in accordance with an embodiment of the present invention, the mechanism is configured to retract the plurality of legs inward by linearly translating each leg of the plurality of legs.

Furthermore, in accordance with an embodiment of the present invention, each leg is mounted on a linearly translatable rack with teeth that are configured to engage teeth of a central gear on the shaft.

Furthermore, in accordance with an embodiment of the present invention, the distal segment includes a bearing that is configured to roll along the cylinder when the plurality of legs is rotated while in contact with the cylinder.

Furthermore, in accordance with an embodiment of the present invention, the shaft includes a structure to enable coupling the shaft to a rotation mechanism.

Furthermore, in accordance with an embodiment of the present invention, the structure includes a socket.

Furthermore, in accordance with an embodiment of the present invention, the cutting edge is oriented at an angle that is substantially equal to a chamfer angle of a chamfer that is to be formed by the tool on the end of the cylinder.

There is further provided, in accordance with an embodiment of the present invention, a method for chamfering an end of a cylinder, the method including: positioning forward-extending distal segments of a plurality of legs of a chamfering tool around the end of the cylinder; rotating a shaft in a central body of the chamfering tool to operate a mechanism of the chamfering tool to retract the plurality of legs inward in tandem toward the cylinder until further retraction is blocked by contact of the distal segments with the cylinder; after the further rotation is blocked, rotating the shaft to operate the mechanism to cause the plurality of legs to rotate around an axis of the shaft so as to cause the distal segments that are in contact with the cylinder to move along the cylinder; and moving the chamfering tool toward the end of the cylinder concurrently with the rotating of the shaft to draw a cutting edge of a chamfering blade along an edge at the end of the cylinder to chamfer the cylinder, the chamfering blade being attached to a leg of the plurality of legs and the cutting edge being oriented diagonally forward and inward.

Furthermore, in accordance with an embodiment of the present invention, rotating the shaft includes operating a rotation mechanism that is coupled to the shaft.

Furthermore, in accordance with an embodiment of the present invention, the rotation mechanism includes a drill.

Furthermore, in accordance with an embodiment of the present invention, rotating the shaft to operate the mechanism includes rotating a central gear on the shaft.

Furthermore, in accordance with an embodiment of the present invention, a gear on each leg of the plurality of legs engages the central gear, the mechanism retracting the legs by rotating the legs toward the surface.

Furthermore, in accordance with an embodiment of the present invention, each leg of the plurality of legs is mounted on a rack that engages the central gear, the mechanism retracting the legs by translating the legs toward the surface.

Furthermore, in accordance with an embodiment of the present invention, the further retraction is blocked by contact of a leg bearing on each of the distal segments with the surface, and wherein rotating the shaft to cause the distal segments that are in contact with the cylinder to move along the cylinder includes causing the leg bearings to roll along the surface.

Furthermore, in accordance with an embodiment of the present invention, moving the chamfering tool toward the cylinder continues until the chamfering of the end of the cylinder is complete.

Furthermore, in accordance with an embodiment of the present invention, the method further includes selecting the chamfering blade and attaching the selected blade to a leg of the plurality of legs, the chamfering blade selected such that the cutting edge is oriented at an angle that is substantially equal to a chamfer angle of a chamfer that is to be formed by the tool on the end of the cylinder.

Furthermore, in accordance with an embodiment of the present invention, rotating the shaft to retract the plurality of legs inward in tandem centers the shaft axis on an axis of the cylinder.

BRIEF DESCRIPTION OF THE DRAWINGS

In order for the present invention to be better understood and for its practical applications to be appreciated, the following figures are provided and referenced hereafter. It should be noted that the figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In accordance with an embodiment of the present invention, a self-adjusting chamfering tool is configured to chamfer an end of a cylinder with a substantially circular cross section. The chamfering tool is self-adjustable to accommodate and chamfer a range of outer diameters of the cylinder.

The tool includes one or a plurality of chamfering blades that are each mounted on a leg of a plurality (e.g., three or more) of legs whose distal ends extend in a forward direction. The cutting edge of each chamfering blade is oriented diagonally forward and inward. Thus, if the cutting edge is drawn along an edge at an end of a cylinder, the cutting edge may diagonally shave the edge of the cylinder, thus producing a beveled chamfer at the edge.

As used herein, a front end or side of the device refers a side or end that is configured to face a cylinder whose end is to be chamfered, or is being chamfered, by the chamfering tool. Similarly, a forward direction refers to a direction toward the end of the cylinder. A rear end or side is configured to face away from the end of the cylinder. A rearward direction refers to a direction away from the end of the cylinder. A lateral direction refers to a sideway direction that is neither forward nor backward (e.g., approximately perpendicular to the forward and backward directions). A motion toward a center or axis of the chamfering tool is herein described as inward, and a motion away from the center or axis of the chamfering tool is herein described as outward.

When an end of a cylinder is to be chamfered, the distal ends of the legs are initially positioned around the end of the cylinder. Typically, not all of the legs are initially in contact with the perimeter of the cylinder. A leg operation mechanism is provided to draw the legs with the chamfering blades inward in tandem toward the cylinder. The inward motion brings the distal ends of the legs into contact with the surface of the cylinder. The inward motion enables the legs to adapt to the diameter of the cylinder while self-centering onto the axis of the cylinder. The leg operation mechanism is further configured to cause the distal ends of the legs to rotationally travel along the perimeter of the cylinder surface. Forward motion of the tool concurrently with the rotation of the legs may bring the chamfering blades into contact with the edge of the end of the cylinder. The rotation of the legs may draw the chamfering blades along the edge that is to be chamfered.

For example, a (typically external to the device) rotation mechanism is operated to axially rotate a shaft in a central body of the device. The shaft may be coupled to a leg operation mechanism in the form of a folding mechanism that is configured to fold the legs inward when the shaft is rotated. With the distal ends of the legs surrounding the end of the cylinder, the folding mechanism may fold the legs inward until the distal ends of all of the legs abut the perimeter of the end of the cylinder.

The inward folding enables the leg positions to self-adjust to a diameter of the cylinder while the chamfering tool self-centers on the axis of the cylinder. The self-adjustment to the diameter of the cylinder may enable a single chamfering tool to be used on cylinders having a range of diameters. Thus, a person or company that chamfers cylinders having a large range of diameters may require only a single chamfering tool or a limited set of different sized chamfering tools, in accordance with an embodiment of the present invention. The self-centering enables the chamfering tool to chamfer a cylinder when both the chamfering tool and the cylinder are handheld or when one or both are mounted, e.g., to a fixture, jig, workbench or vise. Thus, the chamfering tool may be portable or fixed.

Each leg is provided with a bearing that is configured to enable the distal end of the leg to continue to travel around the perimeter of the cylinder after the leg has folded inward to abut the perimeter. For example, the bearing may be configured to rotate axially about a segment near the distal end of the leg. Thus, the bearing may roll along the surface of the cylinder when the leg is traveling along the perimeter of the surface. With the legs are folded against the perimeter at the end of cylinder, the rotation mechanism causes the legs to travel around the cylinder perimeter. While the legs are traveling and folded inward, the chamfering tool may be pressed axially forward against the end of the cylinder. The forward pushing may bring the chamfering blades into contact with the perimeter of the end of the cylinder. The axial rotation of the legs may thus draw each chamfering blade in a circular motion around the edge of the cylinder end, thus shaving material off the edge. The continued combined forward pushing, inward folding, and blade rotation may continue to shave material from the edge until the desired chamfer is formed at the end of the cylinder.

For example, a cylinder whose end is to be chamfered may include a hollow pipe or a solid cylinder. The cylinder may be made of a plastic (e.g., polyvinyl chloride, PVC), wood, a metal (e.g., aluminum, steel, or another metal), or another material that may be chamfered using a blade. Characteristics of the blade (e.g., blade material, shape or type of cutting edge, or other blade characteristics) may be selected in accordance with a type of material that is to be chamfered. An angle of the blade relative to the legs of the chamfering tool may be selected or adjusted in accordance with a desired chamfer angle.

The shaft of the central body is configured to be mounted on a rotation mechanism. For example, the rotation mechanism may include a drill, such as a handheld or portable drill, or may include another motorized or mechanically operable mechanism (e.g., manual drill, wrench, screwdriver, ratcheted wrench or screwdriver, or other manually operated tool) for rotating the shaft of the central body. A rear end of the shaft may include structure that is configured to engage corresponding structure of a drill or similar device. For example, the shaft may include a socket that is shaped to accommodate a male end of an extension bar that is held by the chuck of a drill. Typically, the chamfering tool is configured to be attachable to and detachable from the rotation mechanism. Thus, the chamfering tool may be provided in the form of a drill attachment that may be mounted on the chuck of a drill or other rotation mechanism when the chamfering tool is to be used, and which may be removed after use.

The legs of the chamfering tool are extendible outward in tandem from a central body and are foldable or otherwise retractable inward in tandem toward the central body. For example, the folding mechanism may include a central gear that is mounted on the shaft of the central body of the chamfering tool. The rotation axis of each leg includes a gear that engages the central gear. Thus, when the shaft and the central gear are rotated, or when one of the legs is rotated inward or outward, all of the legs are rotated inward or outward in tandem, each about its respective axis. The gears may be held in place by structure of the central body. For example, the shaft and leg axes may be held in place by structure in parallel front and rear plates of the central body.

A proximal segment of each of the legs of the chamfering tool is connected at the axis to the central body. The proximal segment extends laterally (e.g., perpendicularly) from the axis. For example, the proximal segment may be rotated about its axis outward to extend radially outward from the central body. Rotation of the proximal segment in either direction from the radially extended position causes the proximal segment to fold inward about its axis toward the central body. Maximal inward folding may bring the proximal segment to a position where the proximal segment folded against the central body.

A distal segment of each leg is bent relative to the proximal segment. The distal segment of each leg extends forward from the central body. For example, the distal segments may be approximately perpendicular to the proximal segment and parallel to the shaft of the device. In some cases, the bending angle between the distal segment and the proximal segment may be an angle that is slightly less than or greater than 90°. For example, the bend in the leg may be formed by assembly of separate segments into a single leg.

The distal segments may be placed around the end of the cylinder that is to be chamfered. Rotation of the shaft may fold each of the legs inward toward until further inward folding is prevented by contact of the distal segments (e.g., their bearings) with the perimeter of the cylinder. When some of the distal ends are in contact with the cylinder perimeter while others are not (indicating that the chamfering tool is not centered on the cylinder axis), the inward folding may result in self-centering of the chamfering tool. For example, when the chamfering tool is centered on the cylinder, the shaft of the chamfering tool may be collinear with the axis of the cylinder.

The chamfering blade is located at the bend in each leg between the proximal segment and the distal segment. The cutting edge of the blade extends diagonally between the proximal segment and the distal segment. A blade tilt angle may be defined between the cutting edge and the distal segment. The tilt angle may approximately determine the angle of the chamfer with respect to the cylinder axis.

In some cases, only some of the legs include chamfering blades. A leg that does not have a chamfering blade attached may include a bearing or other structure to facilitate motion of the chamfering blades along an edge of the cylinder.

Alternatively or in addition to a folding mechanism, another type of leg operation mechanism may be provided to draw the legs inward toward the cylinder in tandem. For example, a rack-and-pinion or similar leg operation mechanism may be provided to linearly extend or retract the legs (e.g., a proximal segment of each leg) out of or into a central body. As another example, substantially straight legs that extend forward from the tool may be linearly (e.g., radially or at an oblique angle to the radius) translatable in tandem.

Figure 1:
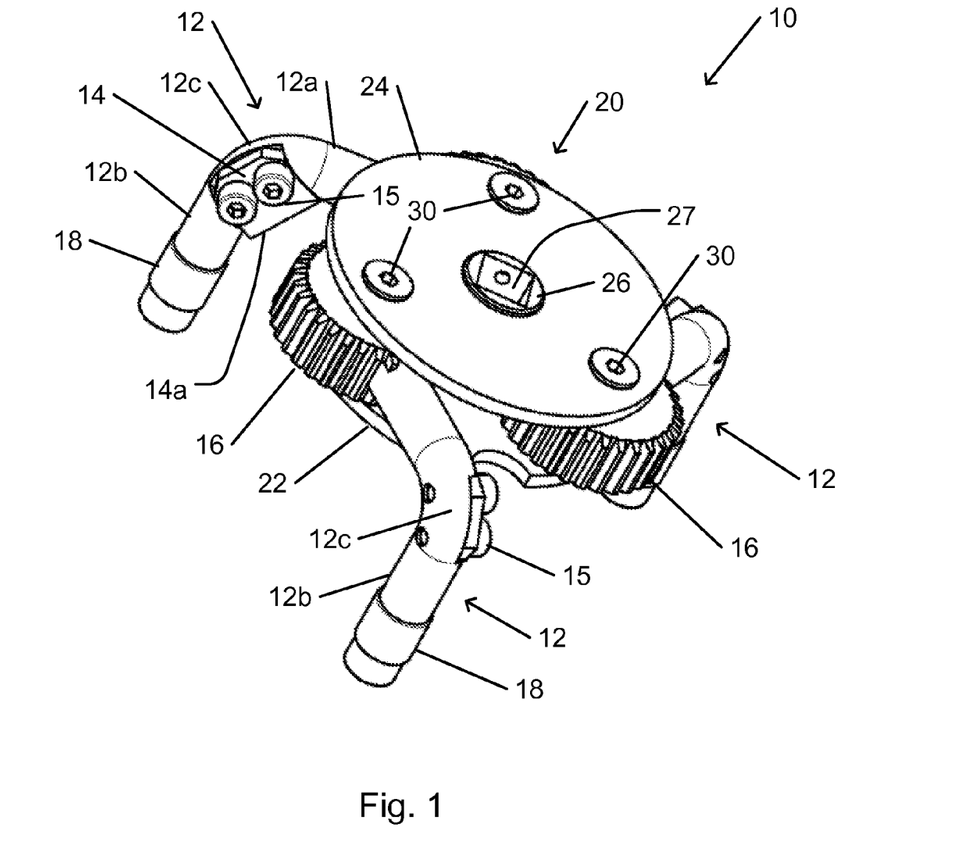
FIG. 1 shows an oblique rear view of a self-adjusting chamfering tool with foldable legs, in accordance with an embodiment of the present invention.
Figure 2:
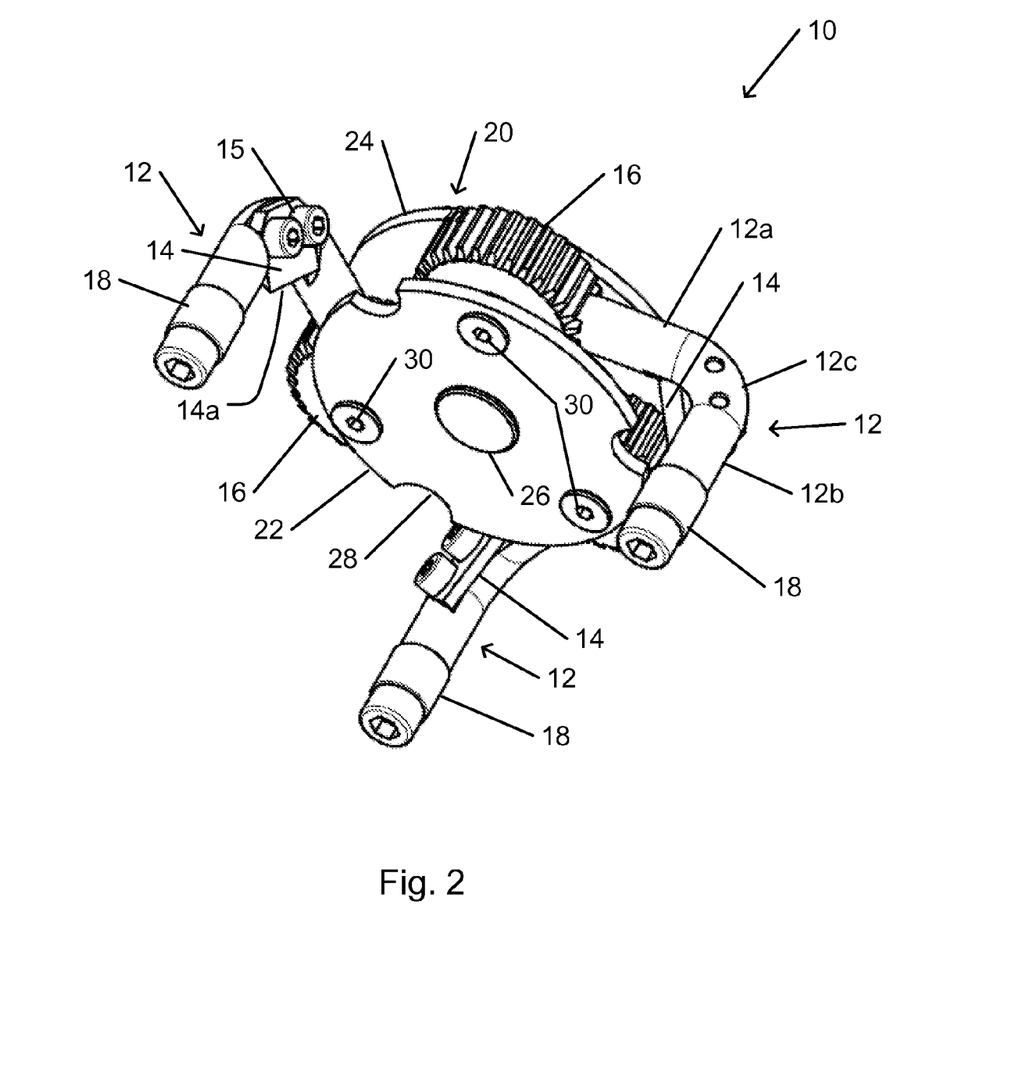
FIG. 2 shows the self-adjusting chamfering tool shown in FIG. 1 in an oblique front view.
Figure 3:
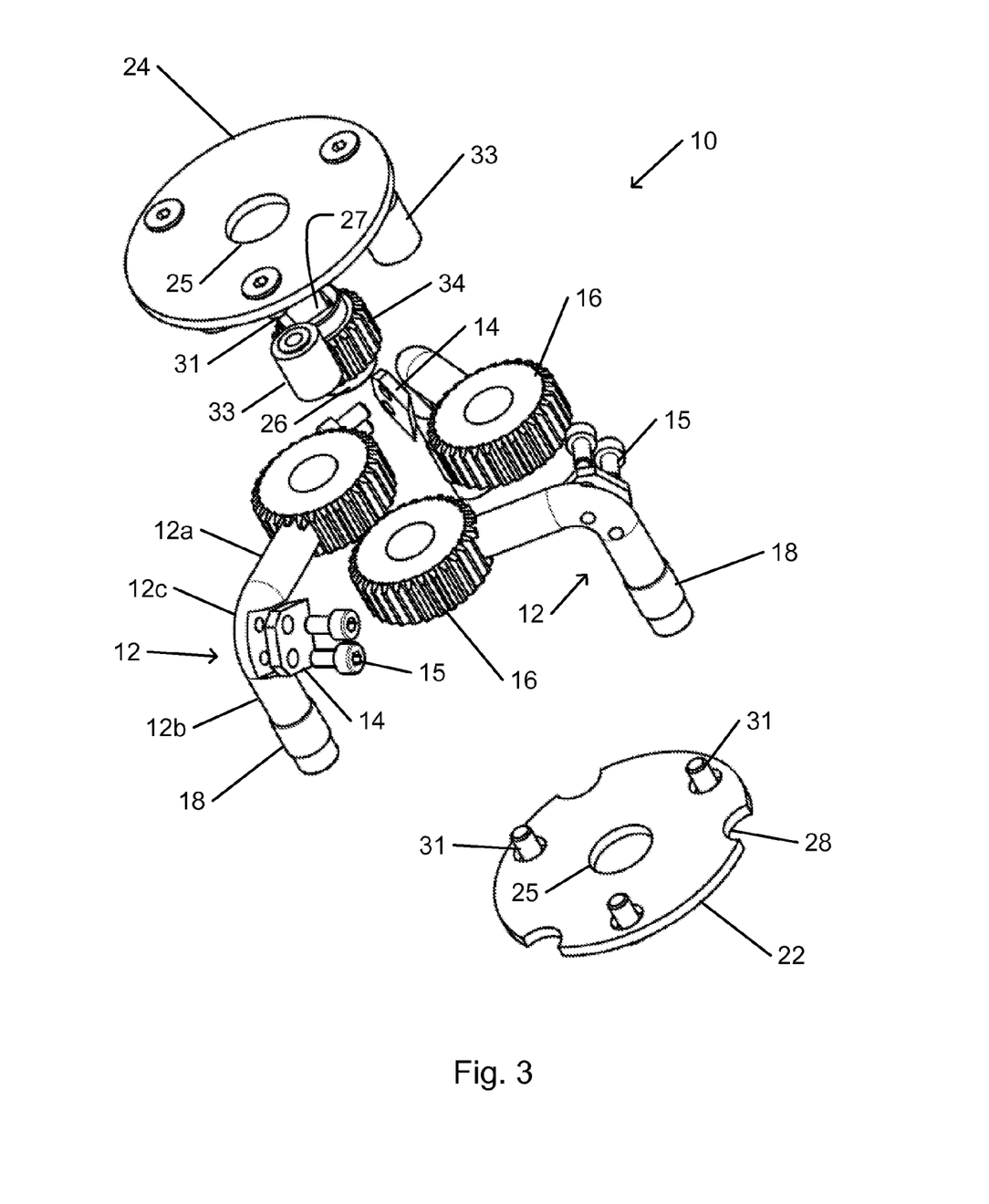
FIG. 3 shows components of the self-adjusting chamfering tool shown in FIG. 1.

FIG. 1 shows an oblique rear view of a self-adjusting chamfering tool with foldable legs, in accordance with an embodiment of the present invention. FIG. 2 shows the self-adjusting chamfering tool shown in FIG. 1 in an oblique front view. FIG. 3 shows components of the self-adjusting chamfering tool shown in FIG. 1.

Chamfering tool 10 includes a plurality of legs 12 that extend from central body 20. In the example shown, chamfering tool 10 includes three legs 12. Alternatively, a chamfering tool may include more than three legs.

Central body 20 is enclosed between front plate 22 and rear plate 24. Front plate 22 is configured to face an end of a cylinder that is being chamfered by chamfering tool 10. Rear plate 24 is configured to face away from the end of the cylinder.

For example, front plate 22 and rear plate 24 may be attached to one another via leg axes 30 that extend from front plate 22 to rear plate 24. In the example shown, each leg axis 30 includes a leg axis bearing 33 whose ends are attached to front plate 22 and to rear plate 24 by axis screws 31. Alternatively or in addition, front plate 22 and rear plate 24 may be held together otherwise to enclose central body 20.

Front plate 22 and rear plate 24 may each include a shaft opening 25. For example, shaft opening 25 may be located at the center of each of front plate 22 and rear plate 24. Central shaft 26 may extend from front plate 22 to rear plate 24. For example, when front plate 22 and rear plate 24 are attached to one another, ends of central shaft 26 may extend through, and may be held in place by, shaft openings 25 in front plate 22 and rear plate 24. Central shaft 26 may rotate axially about tool axis 11 (FIG. 4) with respect to front plate 22 and rear plate 24. For example, a region of contact between central shaft 26 and each of front plate 22 and rear plate 24 may include a bearing. Alternatively or in addition, central shaft 26 may be otherwise held between front plate 22 and rear plate 24.

A rear end of central shaft 26 includes coupling structure that is configured to couple central shaft 26 to a rotation mechanism. For example, the coupling structure may be configured to engage corresponding structure of a rotation mechanism (not shown), such as a drill. For example, a rear end of central shaft 26 may include shaft socket 27. Shaft socket 27 may be configured to engage a male extension with cross section similar to that of shaft socket 27. For example, the male extension may include an extension bar that is held by the chuck of a drill or that is attached to a drill shaft, or similar structure. Alternatively or in addition, structure at the rear end of central shaft 26 may include a male extension that is configured to engage a corresponding female structure of the rotation mechanism. For example, the female structure may include a chuck of a drill, a socket that is held by a chuck of a drill or that is attached to a drill shaft, or similar structure.

Central gear 34 is attached to, and is rotatable with, central shaft 26. Leg axis gears 16 are rotatable about each leg axis 30. For example, each leg axis gear 16 may be attached to an outer part of each leg axis bearing 33. Proximal segment 12a of each leg 12 is attached to, and rotates with, its corresponding leg axis gear 16.

Each leg axis 30 extends within central body 20 from front plate 22 to rear plate 24. For example, ends of each leg axis 30 may be attached to front plate 22 and to rear plate 24 by screws 31, rivets, welding, or otherwise. Each leg axis 30 includes one or more leg axis bearings 33 that enable leg axis gear 16 and leg 12 to laterally rotate about leg axis 30.

When central body 20 is assembled, central gear 34 engages each leg axis gear 16. Thus, legs 12 and central shaft 26 are all coupled to one another so as to cause legs 12 to rotate in tandem. As a result of the coupling, rotation of any one of central shaft 26 and of any of legs 12 may rotate central shaft 26 and all other legs 12. Similarly, when rotation of one or more of legs 12 is impeded or blocked (e.g., by contact with the surface of a body, such as a cylinder or with a component of central body 20), motion of all of legs 12 and of central shaft 26 relative to central body 20 is similarly impeded or blocked.

As shown, central gear 34 on central shaft 26 directly engages each leg axis gear 16 of each leg 12. Thus, the direction of rotation of each leg axis gear 16 is opposite that of central gear 34. Alternatively or in addition, a leg operation mechanism that engages central shaft 26 with legs 12 may include additional intervening gears or may include a mechanism other than a rotating gear mechanism (e.g., an arrangement of pulleys, belts, rack-and-pinion gear mechanism, or other suitable mechanism).

Each leg 12 is attached to central body 20 at leg axis 30. Proximal segment 12a of each leg 12 is attached to leg axis gear 16 and is rotatable about leg axis 30. Distal segment 12b of each leg 12 is bent relative to proximal segment 12a at leg bend 12c so as to extend frontward. For example, distal segment 12b may be bent approximately at a right angle to proximal segment 12a, as shown.

Each leg 12 includes a chamfering blade 14. Chamfering blade 14 may be attached to leg 12 at leg bend 12c by blade attachment structure 15. Blade attachment structure 15 is configured to hold chamfering blade 14 to leg 12. Blade attachment structure 15 is further configured to hold chamfering blade 14 in a fixed orientation at a fixed position relative to leg 12. For example, blade attachment structure 15 may include two or more screws that attach chamfering blade 14 to leg bend 12c, as shown. Alternatively or in addition, blade attachment structure 15 may include one or more clips, brackets, slots, pins, or other suitable structure that is suitable for holding chamfering blade 14 to leg 12 at a fixed orientation and position. Alternatively or in addition, the chamfering blade may be mounted on the leg in a manner that enables at least limited rotation or other movement of the chamfering blade.

Chamfering blade 14 is oriented such that cutting edge 14a of chamfering blade 14 is oriented diagonally forward and inward. The forward and inward diagonal orientation of cutting edge 14a enables chamfering blade 14 to chamfer an end of a cylinder. When legs 12 are folded against the perimeter at an end of a cylinder and chamfering tool 10 is pushed toward that end, drawing cutting edge 14a along an edge of the end may diagonally shave that edge to produce a beveled chamfer. Cutting edge 14a may be oriented at an angle relative to leg axis 30 or to an axis of central shaft 26 that is substantially equal to a chamfer angle of a chamfer that is to be formed at the end of a cylinder. For example, prior to operating chamfering tool 10, a chamfering blade 14 may be selected whose cutting edge 14a is angled to produce a chamfer with a desired chamfer angle. The selected chamfering blade 14 may be attached to leg bend 12c, e.g., using blade attachment structure 15 (e.g., after removing a previously attached chamfering blade 14).

Proximal segment 12a of each leg 12 may rotate about its leg axis 30. For example, proximal segment 12a may be maximally extended radially from central body 20. Proximal segment 12a of each leg 12 may be maximally folded inward. For example, when maximally folded inward, distal segment 12b of the leg 12 may nest within leg recess 28 of front plate 22. Maximal inward folding of legs 12 may enable chamfering tool 10 to occupy minimal space, e.g., for storage or transport. Maximal inward folding of legs 12 may at least partially shield each chamfering blade 14 between front plate 22 and rear plate 24 of central body 20. The shielding of each chamfering blade 14 may protect chamfering blade 14 from contacting other objects during storage, handling, or transport. Protecting chamfering blade 14 from contact with other objects may prevent injury to other objects stored with chamfering tool 10, to people handling chamfering tool 10, and may prevent damage to chamfering blade 14 itself.

Distal segment 12b of leg 12 is provided with a contact bearing 18. The diameter of contact bearing 18 may be slightly larger than that of an adjacent portion of distal segment 12b. Contact bearing 18 is configured to rotate freely about the axis of distal segment 12b. Thus, when distal segment 12b of leg 12 is folded against the perimeter of a cylinder (or another surface) and is drawn along the surface, contact bearing 18 may enable distal segment 12b to travel along the surface. Thus, legs 12 with chamfering blades 14 may be drawn across the surface of a Alternatively to distal segment 12b being bent at a right angle to proximal segment 12a, a distal segment may be bent at a different, oblique angle with respect to its proximal segment. A bend at an oblique angle may require corresponding changes in the structure and components of the legs and central body in order to function in a manner similar to chamfering tool 10. For example, the distal segment may be curved, or a contact bearing may have to be bulged or otherwise shaped, in order to enable the leg and contact bearing to maintain contact with a cylinder whose edge is being chamfered.

Alternatively to rotatable legs 12, a proximal segment of the leg may be orientated radially. A mechanism may be provided to radially extend or retract the proximal segment.

Alternatively to a bent leg 12, a leg may be substantially straight and extend frontward. A mechanism to extend or retract the leg may radially translate the leg inward or outward.

Figure 4:
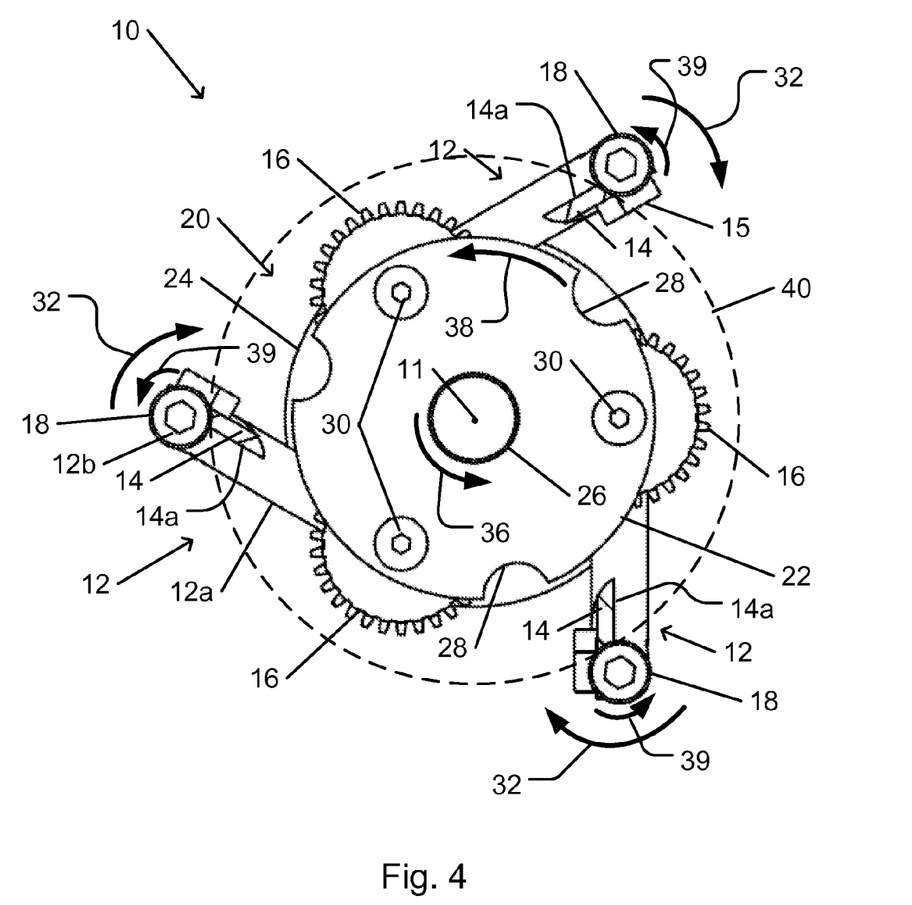
FIG. 4 shows a frontal view of the self-adjusting chamfering tool shown in FIG. 1 with its legs folded about a cylinder.

FIG. 4 shows a frontal view of the self-adjusting chamfering tool shown in FIG. 1 with its legs folded about a cylinder.

As shown, distal segments 12b of legs 12 of chamfering tool 10 abut and are centered about cylinder 40 (which is represented by an outline indicating the perimeter of cylinder 40).

As shown, central shaft 26 of chamfering tool 10 is being driven to rotate with shaft rotational motion 36 about tool axis 11 (coinciding with the axis of rotation of central shaft 26). For example, a rear end of central shaft 26 may be driven by a drill, or another motorized, manually (e.g., by ratchet wrench or screwdriver, or other manually operated tool), or otherwise powered mechanism for rotating central shaft 26. As a result of an internal mechanism of central body 20, each leg 12 is driven to rotate about its leg axis 30 with leg folding motion 32 toward central body 20. For example, the internal mechanism may include engaging of each leg axis gear 16 by central gear 34 (FIG. 3).

In the absence of cylinder 40, continued rotation of each leg 12 may maximally fold each leg 12 against central body 20 in the direction of leg folding motion 32. Maximal folding of each leg 12 in toward central body 20 brings distal segment 12b of leg 12 to one of leg recesses 28 on front plate 22 of central body 20 (e.g., the trailing leg recess 28 with respect to shaft rotational motion 36). Contact with leg recess 28 and front plate 22 may then prevent any further folding of leg 12. When leg 12 is maximally folded, all or part of proximal segment 12a of leg a may be situated between front plate 22 and rear plate 24. When leg 12 is maximally folded, all or part of cutting edge 14a of chamfering blade 14 may be situated between front plate 22 and rear plate 24.

Chamfering tool 10 may be placed over the end of a cylinder 40. For example, legs 12 may be initially separated (e.g., manually or otherwise) such that their separation is greater than the diameter of cylinder 40. A torque may then be applied to central shaft 26 (e.g., via shaft socket 27 or otherwise) to rotate central shaft 26 in the direction of shaft rotational motion 36 about tool axis 11. The rotation of central shaft 26 with shaft rotational motion 36 rotates legs 12 inward in tandem. Each leg 12 is rotated inward with leg folding motion 32. The tandem inward rotation continues until contact bearing 18 on distal segment 12b of leg 12 comes into contact with the outer perimeter of the surface cylinder 40 (the situation shown in FIG. 4).

Tool axis 11 of chamfering tool 10 may initially be misaligned with cylinder 40 (e.g., tool axis 11 is not collinear or otherwise aligned with the axis of cylinder 40). In this case, contact bearings 18 on some of legs 12 may come into contact with the surface of cylinder 40 while contact bearings 18 of other legs 12 are still rotating toward the surface. In this case, the continued inward rotation with leg folding motion 32 may serve to align tool axis 11 of chamfering tool 10 with cylinder 40.

When contact bearings 18 of all legs 12 have rotated with leg folding motion 32 to contact with the surface of cylinder 40, the surface of cylinder 40 may block any further inward rotation of leg 12.

After inward rotation of legs 12 is blocked by contact with cylinder 40, continued rotation of central shaft 26 with shaft rotational motion 36 may apply a torque to central body 20 as a whole. For example, the torque may be applied to leg axes 30 via central gear 34 and leg axis gears 16. As a result of the applied torque, central body 20 and chamfering tool 10 may rotate as a whole with tool rotational motion 38 about tool axis 11.

When chamfering tool 10 is rotating with tool rotational motion 38, contact bearings 18 may roll with bearing rotational motion 39 along the outer perimeter of cylinder 40. Thus, chamfering tool 10 may rotate with tool rotational motion 38 relative to cylinder 40. For example, cylinder 40 may be hand held or otherwise immobilized to prevent cylinder 40 from rotating.

When chamfering tool 10 is rotating with tool rotational motion 38, cutting edges 14a of chamfering blades 14 may be pressed against the end of cylinder 40. Cutting edges 14a may then shave material from the end of cylinder 40, thus chamfering the end of cylinder 40.

In some cases, the rotation may be reversible. Thus, rotation of central shaft 26 in a direction opposite of the indicated shaft rotational motion 36 may cause legs 12 to rotate with a rotation that is opposite to the indicated leg folding motion 32. The rotation opposite of the indicated leg folding motion 32 may initially extend legs 12 outward from the position shown in FIG. 4. After maximum extension of legs 12 radially outward from central body 20, continued rotation opposite to the indicated leg folding motion 32 may fold legs 12 toward central body with an orientation opposite that shown in FIG. 4. After legs 12 are folded against cylinder 40, chamfering tool 10 may rotate relative to cylinder 40 with a rotation that is opposite to the indicated tool rotational motion 38, with contact bearings 18 rotating in a direction opposite to the indicated bearing rotational motion 39. In some cases, cutting edges 14a and chamfering blades 14 may be configured to have a preferential direction of operation for effective or efficient chamfering of a cylinder 40.

Figure 5A:
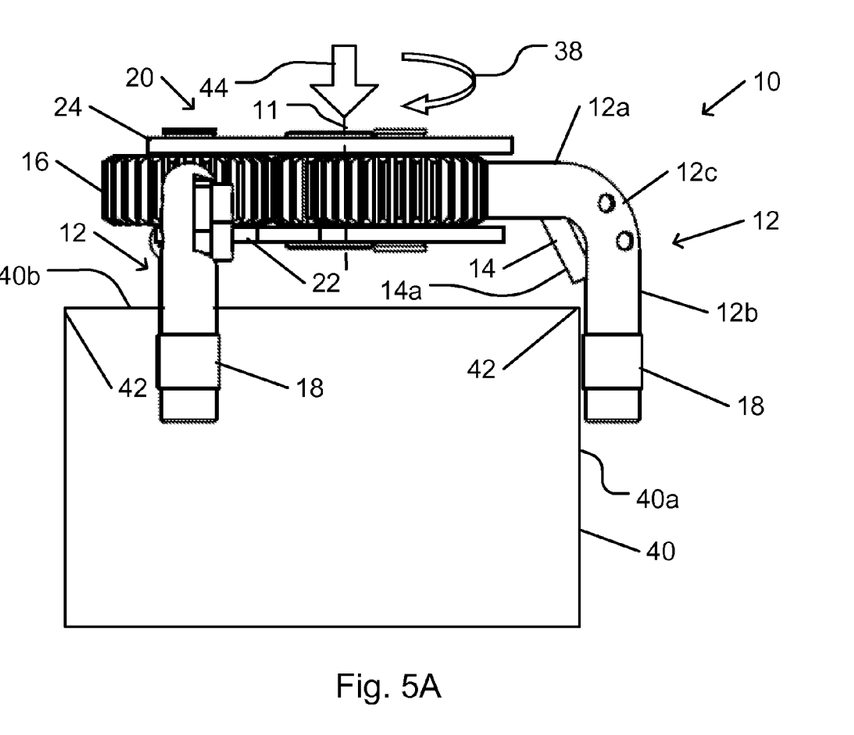
FIG. 5A shows a side view of the self-adjusting chamfering tool shown in FIG. 1 prior to chamfering a cylinder.

FIG. 5A shows a side view of the self-adjusting chamfering tool shown in FIG. 4 prior to chamfering the cylinder.

As shown, contact bearings 18 of legs 12 are in contact with the perimeter of surface 40a of cylinder 40. Chamfering tool 10, including central body 20 and legs 12, is rotating with tool rotational motion 38 about tool axis 11. Contact bearings 18 enable legs 12 to travel about the perimeter of cylinder 40 with reduced or minimal friction.

Initially, cylinder end edge 42 of cylinder 40 may be sharp, as shown. For example, cylinder 40 may be in the form of a right circular cylinder with cylinder end edge 42 formed that the circular boundary where circular end 40b meets surface 40*a*. Cylinder 40 may be solid or may be hollow with walls of finite thickness and open circular end 40*b*.

With legs 12 traveling along surface 40*a* of cylinder 40 with tool rotational motion 38 about tool axis 11, chamfering tool 10 may be moved toward circular end 40*b* with forward translational motion 44. For example, a handheld drill to which chamfering tool 10 is attached may be manually moved forward with forward translational motion 44. Alternatively or in addition, a mechanically or electrically powered mechanism may move chamfering tool 10 forward with forward translational motion 44. Forward translational motion 44 may bring cutting edges 14*a* of chamfering blades 14 into contact with cylinder end edge 42. When tool rotational motion 38 draws cutting edge 14*a* of chamfering blade 14 along cylinder end edge 42, cutting edge 14*a* may shave material off of cylinder end edge 42, thus chamfering cylinder 40.

As cutting edge 14*a* shaves material off of cylinder end edge 42, forward translational motion 44 may continue concurrently with tool rotational motion 38. Forward translational motion 44 may continue until stopped by structure of chamfering tool 10 coming into contact with a part of circular end 40*b*. For example, if cylinder 40 is a hollow pipe, further forward translational motion 44 may be blocked when proximal segment 12*a* of leg 12 comes into contact with the wall of the cylinder. If cylinder 40 is solid (e.g., filled), further forward translational motion 44 may be blocked by front plate 22 or a front end of central shaft 26 coming into contact with circular end 40*b* of cylinder 40. In some cases, forward translational motion 44 may be halted by the person or mechanism that pushes chamfering tool 10 forward.

Figure 5B:
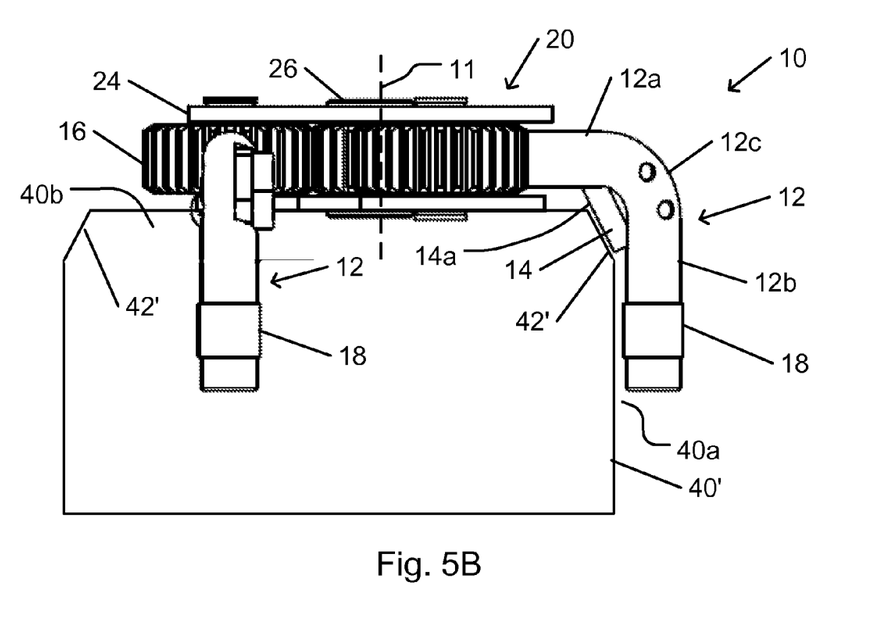
FIG. 5B shows the self-adjusting chamfering tool shown in FIG. 5A after chamfering a cylinder.

FIG. 5B shows the self-adjusting chamfering tool shown in FIG. 5A after chamfering a cylinder.

In FIG. 5B, chamfering tool 10 has been pushed sufficiently forward such that cutting edges 14*a* of chamfering blades 14 have produced chamfered edge 42' on chamfered cylinder 40'. At this point, forward motion 44 and tool rotational motion 38 may be halted. Legs 12 may be extended outward to enable removal of chamfering tool 10 from chamfered cylinder 40'. For example, one or more of legs 12 may be manually manipulated to extend legs 12 outward in tandem. Alternatively or in addition, shaft 26 may be momentarily rotated in a direction opposite the direction indicated by shaft rotational motion 36 for a period of time that is sufficient to remove contact bearings 18 from chamfered cylinder 40'.

In accordance with an embodiment of the present invention, legs of a self-adjusting chamfering tool may be linearly moveable in tandem, in accordance with an embodiment of the present invention.

Figure 6:
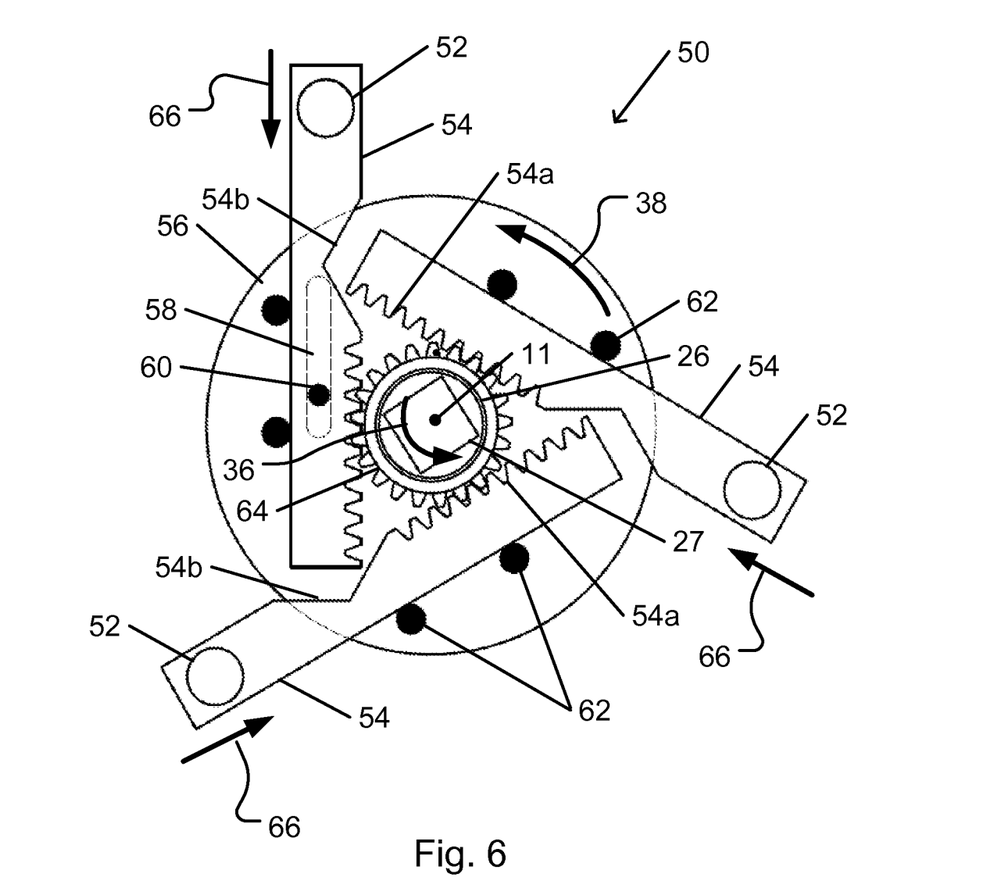
FIG. 6 is a schematic illustration of a mechanism of a self-adjusting chamfering tool with linearly moveable legs, in accordance with an embodiment of the present invention.

FIG. 6 is a schematic illustration of a mechanism of a self-adjusting chamfering tool with linearly moveable legs, in accordance with an embodiment of the present invention.

As shown, chamfering tool 50 is viewed from the front with its front plate removed.

Chamfering tool 50 includes a plurality (e.g., at least three, as in the example shown) of legs 52. Each leg 52 is mounted on a leg rack 54. Each leg 52 may be substantially straight and extend in a forward direction from leg rack 54. In some cases, a leg 52 may include one or more bends or curves. A chamfering blade (not shown) may be attached to one or more of legs 52, e.g., at an attachment of each leg 52 to leg rack 54. A cutting edge of the chamfering blade may be oriented diagonally forward and inward from the attachment of leg 52 to leg rack 54. Each leg 52 may include a bearing (not shown, similar to bearing 18 as shown in FIG. 1) to enable leg 52 to travel along a surface of a cylinder.

Each leg rack 54 is linearly translatable along its length. All of leg racks 54 are coupled directly, as shown, or indirectly (e.g., via intervening gears or other coupling mechanisms) to central gear 64. Central gear 64 is mounted on central shaft 26. When leg rack 54 is directly coupled to central gear 64, as shown, central gear 64 functions as a pinion gear for driving translational motion of leg rack 54. Teeth of the pinion gear in the form of central gear 64 engage teeth 54 of each leg rack 54. Since all of leg racks 54 are coupled to central gear 64, all of leg racks 54 are coupled to one another so as to be constrained to move inward or outward in tandem with one another. Thus, legs 52 may be linearly extended outward or retracted inward in tandem.

When being moved with translational motion, each leg rack 54 held in place by central gear 64 and guide posts 62. For example, each guide post may be attached to one or both of rear plate 56, a front plate (not shown). The extend of translation motion of leg racks 54 may be limited by limiting structure that cooperates with corresponding structure on one or more of leg racks 54. In the example shown, translation motion of slot 58 on one of leg racks 54 is limited by limiting pin 60 that is circumscribed by slot 58. Alternatively or in addition, limiting structure may include stops in the form of one or more tabs or pins, or other structure.

Each leg rack 54 may be shaped to enable retraction of all legs 52 in tandem, such that each leg rack 54 may be retracted without interference from another leg rack 54. For example, each leg rack 54 may include indentation 54*b*. Alternatively or in addition, a leg rack may be curved to move inward or outward along a curved path that avoids colliding with another leg rack. A leg rack may be otherwise shaped to enable retraction without mutual interference.

As shown, central shaft 26 of chamfering tool 50 is being driven to rotate with shaft rotational motion 36 about tool axis 11. For example, a rear end of central shaft 26 may be driven by a drill, or another motorized or otherwise powered mechanism for rotating central shaft 26. The rotation mechanism may engage shaft socket 27 or other structure on central shaft 26.

The rotation of central shaft 26 rotates central gear 64 with shaft rotational motion 36 about tool axis. As a result of the rotation of central gear 64, teeth 54*a* of each leg rack 54 are engage to retract leg rack 54 inward with rack retraction motion 66. Thus, legs 52 move inward in tandem with rack retraction motion 66.

When chamfering tool 50 is placed over the end of a cylinder, the in tandem retraction of legs 52 with rack retraction motion 66 may continue until all legs 52 come into contact with the surface of the cylinder.

Tool axis 11 of chamfering tool 50 may initially be misaligned with the cylinder (e.g., tool axis 11 is not collinear or otherwise aligned with the axis of the cylinder). In this case, some of legs 52 may come into contact with the surface of the cylinder while other legs 52 are still moving toward the surface. In this case, the continued inward translation of legs 52 may serve to align tool axis 11 of chamfering tool 50 with the cylinder.

When all legs 52 are in contact with the surface of the cylinder 40, the surface of the cylinder may block any further inward motion of legs 52.

After inward rotation of legs 52 is blocked by contact with the cylinder, continued rotation of central shaft 26 with shaft rotational motion 36 may apply a torque to chamfering tool 50 as a whole. As a result of the applied torque, chamfering tool 50 may rotate as a whole with tool rotational motion 38 about tool axis 11.

When chamfering tool 50 is rotating with tool rotational motion 38, the cutting edges of the chamfering blades may be pressed against the end of the cylinder to chamfer the end of the cylinder.

Figure 7:
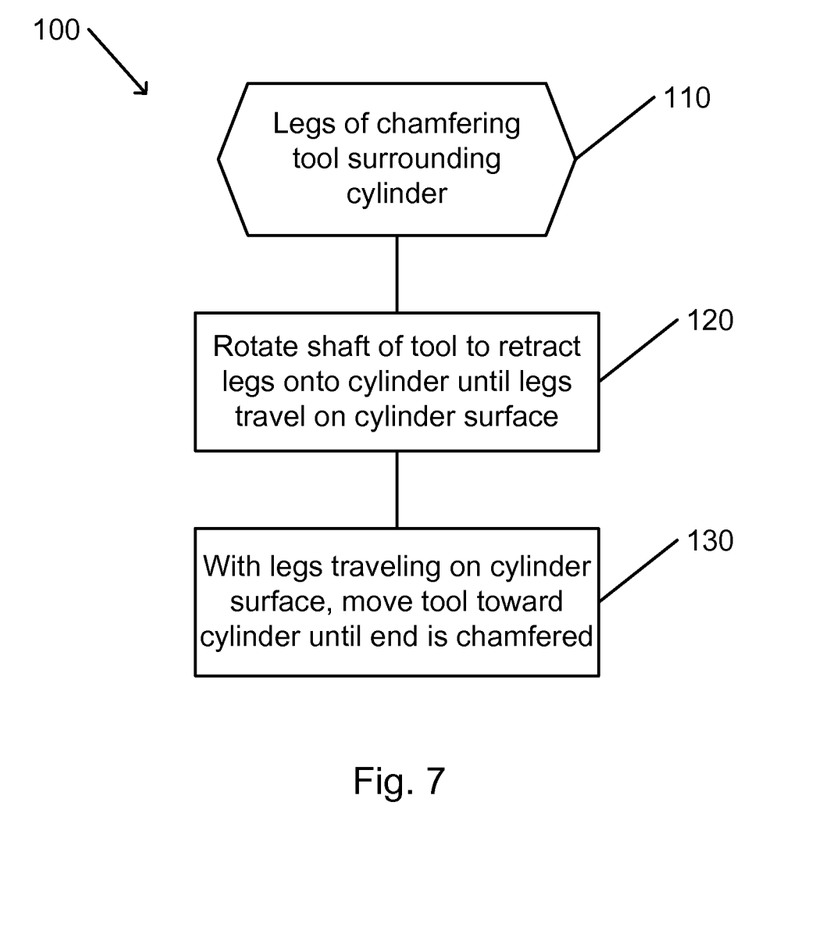
FIG. 7 is a flowchart depicting a method for chamfering a cylinder, in accordance with an embodiment of the present invention.

FIG. 7 is a flowchart depicting a method for chamfering a cylinder, in accordance with an embodiment of the present invention. The method is described with reference to FIGS. 4, 5A, and 5B.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Chamfering method 100 may be performed by a person or mechanism that is operating chamfering tool 10 or 50 (FIG. 6). For simplicity, the discussion of operations of chamfering method 100 is limited to the example of chamfering tool 10. However, it should be understood that each operation of chamfering method 100 is applicable, mutatis mutandis, to use of chamfering tool 50.

Chamfering method 100 may be performed when distal segment 12b, or more particularly, contact bearing 18, of all of legs 12 of chamfering tool 10 surround circular end 40b of cylinder 40 (block 110). When surrounding circular end 40b, any line segment that extends from contact bearing 18 on one leg 12 to contact bearing 18 on another leg 12 intersects surface 40a of cylinder 40 at two different points.

A torque may be applied to central shaft 26 of chamfering tool 10 to rotate central shaft 26 (e.g., with shaft rotational motion 36 or the opposite motion) so as to retract (e.g., fold) legs 12 onto surface 40a of cylinder 40 (block 120). The torque may continue to be applied after contact bearings 18 of legs 12 come into contact with surface 40a. The continued application of the torque may rotate chamfering tool 10 (e.g., with tool rotational motion 38 or the opposite rotation) about tool axis 11, with legs 12 traveling around the perimeter of surface 40a, the traveling being facilitated by contact bearings 18.

With legs 12 traveling around perimeter of surface 40a of cylinder 40, chamfering tool 10 may be moved forward toward cylinder 40 with forward translational motion 44 (block 130). The movement of chamfering tool 10 with forward translational motion 44 may continue until cutting edges 14a of chamfering blades 14 contact, and are drawn along, cylinder end edge 42 of cylinder 40. Continued movement of chamfering tool 10 with forward translational motion 44 concurrently with drawing of cutting edges 14a along cylinder end edge 42 may continue until chamfering is complete, e.g., until chamfered edge 42' is formed as desired.

After chamfering is complete, chamfering tool 10 may be removed from cylinder 40.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A self-adjusting tool for chamfering an end of a cylinder, the tool comprising:
   at least three legs, a distal segment of each of the legs extending in a forward direction of the tool and placeable about the end of the cylinder, each of the legs including an indentation and a linearly translatable rack comprising teeth;
   a central body with a rotatable shaft and a mechanism that includes central gear that is mounted on and is rotatable with the shaft, the central gear comprising teeth that are configured to engage the teeth on the linearly translatable rack on each of the legs such that rotation of the shaft about a shaft axis linearly translates each leg of said at least three legs to retract said at least three legs inward in tandem toward the cylinder,
   wherein the indentation on each leg of said at least three legs is configured to enable retraction of another leg of said at least three legs without interference and wherein the mechanism is configured to rotate said at least three legs about the shaft axis when further retraction of said at least three legs is blocked by contact with the cylinder; and
   one or a plurality of chamfering blades, each chamfering blade being attached to a leg of said at least three legs, a cutting edge of each blade being oriented diagonally forward and inward.

2. The tool of claim 1, wherein each leg of said at least three legs includes a bend between a proximal segment that is laterally extendible from the central body and the distal segment.

3. The tool of claim 2, wherein said each chamfering blade is attached to the bend of a leg of said at least three legs.

4. The tool of claim 1, wherein the distal segment includes a bearing that is configured to roll along the cylinder when said at least three legs is rotated while in contact with the cylinder.

5. The tool of claim 1, wherein the shaft includes a structure to enable coupling the shaft to a rotation mechanism.

6. The tool of claim 1, wherein the cutting edge is oriented at an angle that is substantially equal to a chamfer angle of a chamfer that is to be formed by the tool on the end of the cylinder.

7. A method for chamfering an end of a cylinder, the method comprising:
- positioning forward-extending distal segments of a plurality of legs of a chamfering tool around the end of the cylinder, said plurality of legs comprising at least three legs, each of the legs including an indentation and a linearly translatable rack comprising teeth;
- rotating a shaft in a central body of the chamfering tool to rotate a central gear that is mounted on and is rotatable with the shaft and that comprises teeth, such that the teeth of the central gear engage the teeth on the linearly translatable rack on each of the legs, so as to linearly translate each leg of said plurality of legs to retract said plurality of legs inward in tandem toward the cylinder until further retraction is blocked by contact of the distal segments with the cylinder;
- after the further retraction is blocked, continuing to rotate the shaft to cause said plurality of legs to rotate around an axis of the shaft so as to cause the distal segments that are in contact with the cylinder to move along the cylinder, wherein the indentation on each leg of said at least three legs is configured to enable retraction of another leg of said at least three legs without interference; and
- moving the chamfering tool toward the end of the cylinder concurrently with the rotating of the shaft to draw a cutting edge of a chamfering blade along an edge at the end of the cylinder to chamfer the cylinder, the chamfering blade being attached to a leg of said plurality of legs and the cutting edge being oriented diagonally forward and inward.

8. The method of claim 7, wherein rotating the shaft comprises operating a rotation mechanism that is coupled to the shaft.

9. The method of claim 8, wherein the rotation mechanism comprises a drill.

10. The method of claim 7, wherein moving the chamfering tool toward the cylinder continues until the chamfering of the end of the cylinder is complete.

11. The method of claim 7, further comprising selecting the chamfering blade and attaching the selected blade to a leg of said plurality of legs, the chamfering blade selected such that the cutting edge is oriented at an angle that is substantially equal to a chamfer angle of a chamfer that is to be formed by the tool on the end of the cylinder.

12. The method of claim 7, wherein rotating the shaft to retract said plurality of legs inward in tandem centers the shaft axis on an axis of the cylinder.

* * * * *